(12) United States Patent
Krishnan M R et al.

(10) Patent No.: US 11,849,040 B2
(45) Date of Patent: Dec. 19, 2023

(54) ADAPTIVE RATE LIMITING OF API CALLS

(71) Applicant: MICRO FOCUS LLC, Santa Clara, CA (US)

(72) Inventors: Abhay Krishnan M R, Santa Clara, CA (US); Vamsi Krishna, Santa Clara, CA (US)

(73) Assignee: Micro Focus LLC, Santa Clara, CA (US)

( * ) Notice: Subject to any disclaimer, the term of this patent is extended or adjusted under 35 U.S.C. 154(b) by 259 days.

(21) Appl. No.: 16/940,143

(22) Filed: Jul. 27, 2020

(65) Prior Publication Data

US 2022/0029806 A1 Jan. 27, 2022

(51) Int. Cl.
*H04L 9/32* (2006.01)
*H04L 67/02* (2022.01)
*H04L 67/01* (2022.01)

(52) U.S. Cl.
CPC .......... *H04L 9/3213* (2013.01); *H04L 9/3247* (2013.01); *H04L 67/01* (2022.05); *H04L 67/02* (2013.01)

(58) Field of Classification Search
CPC ..... H04L 9/3213; H04L 9/3247; H04L 67/02; H04L 67/42
USPC .................................................. 709/223, 225
See application file for complete search history.

(56) References Cited

U.S. PATENT DOCUMENTS

| | | | |
|---|---|---|---|
| 7,331,060 B1 | 2/2008 | Ricciulli | |
| 7,805,436 B2 | 9/2010 | Richards et al. | |
| 8,645,936 B2 | 2/2014 | Mahajan | |
| 8,959,572 B2 * | 2/2015 | Yin | H04L 63/083 726/1 |
| 9,195,805 B1 | 11/2015 | Brandwine | |
| 9,602,482 B1 * | 3/2017 | Roth | H04L 63/107 |
| 9,729,557 B1 | 8/2017 | Sanyal et al. | |
| 9,876,778 B2 | 1/2018 | Smith et al. | |
| 2007/0266426 A1 * | 11/2007 | Iyengar | H04L 63/1458 726/5 |
| 2011/0119155 A1 * | 5/2011 | Hammad | G06Q 20/42 235/382 |

(Continued)

FOREIGN PATENT DOCUMENTS

| | | | |
|---|---|---|---|
| CN | 105491001 | * | 4/2016 |
| WO | WO-2019034979 | | 2/2019 |

OTHER PUBLICATIONS

Regio Michelin et al, Mitigation DoS to Authenticated Cloud REST APIs, Computer Science School, 2014.

*Primary Examiner* — Zi Ye
*Assistant Examiner* — Mariegeorges A Henry
(74) *Attorney, Agent, or Firm* — Sheridan Ross P.C.

(57) ABSTRACT

According to examples, an apparatus may include a processor and a memory on which are stored machine-readable instructions that when executed by the processor, may cause the processor to receive a request from a client for a status of the client, and based on the status of the client, generate a token associated with application programming interface (API) calls to be received from the client. In some examples, the token may include a value representing a priority for determining an adaptive rate limiting of the API calls to be received from the client. The processor may send a response to the request, in which the response may include the status of the client and the token.

20 Claims, 4 Drawing Sheets

(56) References Cited

U.S. PATENT DOCUMENTS

| | | | |
|---|---|---|---|
| 2015/0365348 A1* | 12/2015 | Matsuda | H04L 67/10 |
| | | | 709/225 |
| 2017/0063759 A1* | 3/2017 | McClune | H04L 51/52 |
| 2017/0161973 A1* | 6/2017 | Katta | G06Q 40/08 |
| 2018/0357660 A1* | 12/2018 | Chitilian | G06Q 30/0263 |
| 2019/0286834 A1* | 9/2019 | Luff | G06F 9/546 |
| 2019/0334884 A1* | 10/2019 | Ross | G06F 21/41 |

* cited by examiner

FIG. 4

ADAPTIVE RATE LIMITING OF API CALLS

BACKGROUND

Electronic apparatuses, such as mobile devices, tablets, desktop computers, laptop computers, and/or the like, may connect to servers over a network. The servers may implement rate limiting to limit a number of requests received from the electronic apparatuses.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Client endpoint devices, such as mobile devices, tablets, desktop computers, laptop computers, and/or the like, may connect to servers over a network. In some examples, the servers may enable endpoint management to manage entire life cycles of client endpoint devices. The communication between clients and servers may be implemented over Hypertext Transfer Protocol (HTTP) and may use various messaging protocols, such as Simple Object Access Protocol (SOAP), Representational State Transfer (REST), and/or the like. In this regard, messages may be sent between the clients and the servers through SOAP/REST application programming interface (API) calls over HTTP.

Due to increasing needs of, for instance, managing a remote work force and associated network connected electronic apparatuses, administrators may more often host application servers on the Internet or in demilitarized zone (DMZ) types of network configurations. As a result, the servers may be exposed to attacks, such as Denial of Service (DOS) attacks. In some examples, rate limiting may be implemented by which administrators may define a "policy" on servers to limit, for instance, a number of API calls or requests for files associated with a job to be performed on the client. However, static rate limiting may use pre-set thresholds for various APIs, which may not sufficiently address certain types of requests or situations, for instance, situations in which legitimate spikes in load during peak hours are needed, priority based rate limiting, and/or the like.

Disclosed herein are methods, apparatuses, and computer-readable mediums that may allow adaptive rate limiting based on a priority associated with jobs to be performed on the client. In some examples, a management server may implement adaptive rate limiting. For instance, the management server may determine whether to grant a request or an API call from a client based on information related to an amount of work to be performed by the client. The management server may accomplish this using client requests for periodic client "check-in." For instance, a client may periodically contact a server to reconcile its state. By way of particular example, the server may determine an amount work to be performed by the client based on a status of the client including, for instance, the jobs and work-to-do on the client. At this time, the server may use this information for the particular client to compute, for instance, a number of API calls that the client may make in order to complete the identified tasks. In some examples, the server, having computed the work-to-do for the client, may respond with the status of the client, a list of jobs that the client is to perform, and/or the like. At this time, the server may include a token in the HTTP response, in order to enable subsequent servers to enable adaptive rate limiting.

In some examples, the token may be a lightweight JavaScript Object Notation (JSON) token (e.g., a JSON web token (JWT)) that has a header, body, and a signature. The body may include various fields (or calls) that include name-value pairs of information for the token including, for instance, an integer that indicates a number of API calls that the client may make to fulfil a work-to-do, a number of files to be downloaded, and/or the like. Each subsequent request or API call from the client may include the JWT token, and the server or another server may grant the request or API call based on a value of the name-value pair included in the JWT token.

In some examples, a server may receive a request from a client for a status of the client, and based on the status of the client, the server may generate a token associated with API calls to be received from the client. In this regard, the server may send a response to the request, in which the response may include the status of the client and the token.

By enabling a server to grant requests based on a token associated with API calls to be received from the client, the server may implement rate limiting in an adaptive manner and allow the server to operate more securely and efficiently. For instance, the server may generate a lightweight token, which may indicate to downstream servers to honor the request for its legitimate need, thereby enabling rate limiting based on adaptive contexts including, for example, client data contexts, priority contexts, load-balancing contexts, and/or the like. In some examples, the server may improve rate limiting by granting requests based on an amount of work-to-do on the client and/or a priority of the work-to-do, thereby enhancing security and efficiency by preventing malicious requests while adaptively granting legitimate requests based on a computed amount of work and/or a priority associated with a particular client and/or jobs.

Figure 1:
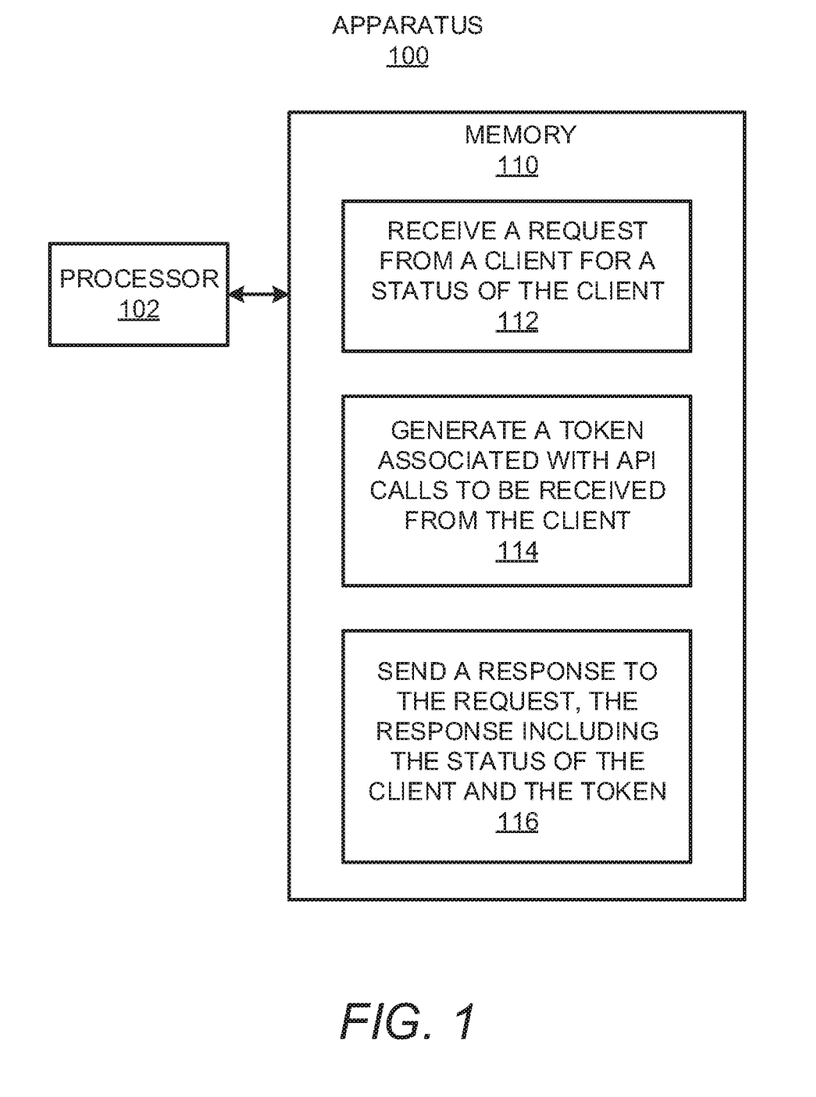
FIG. 1 shows a block diagram of an example apparatus that may generate a token associated with application programming interface (API) calls to be received from a client, in which the token includes a value representing a priority for determining adaptive rate limiting of the API calls to be received from the client.
Figure 2:
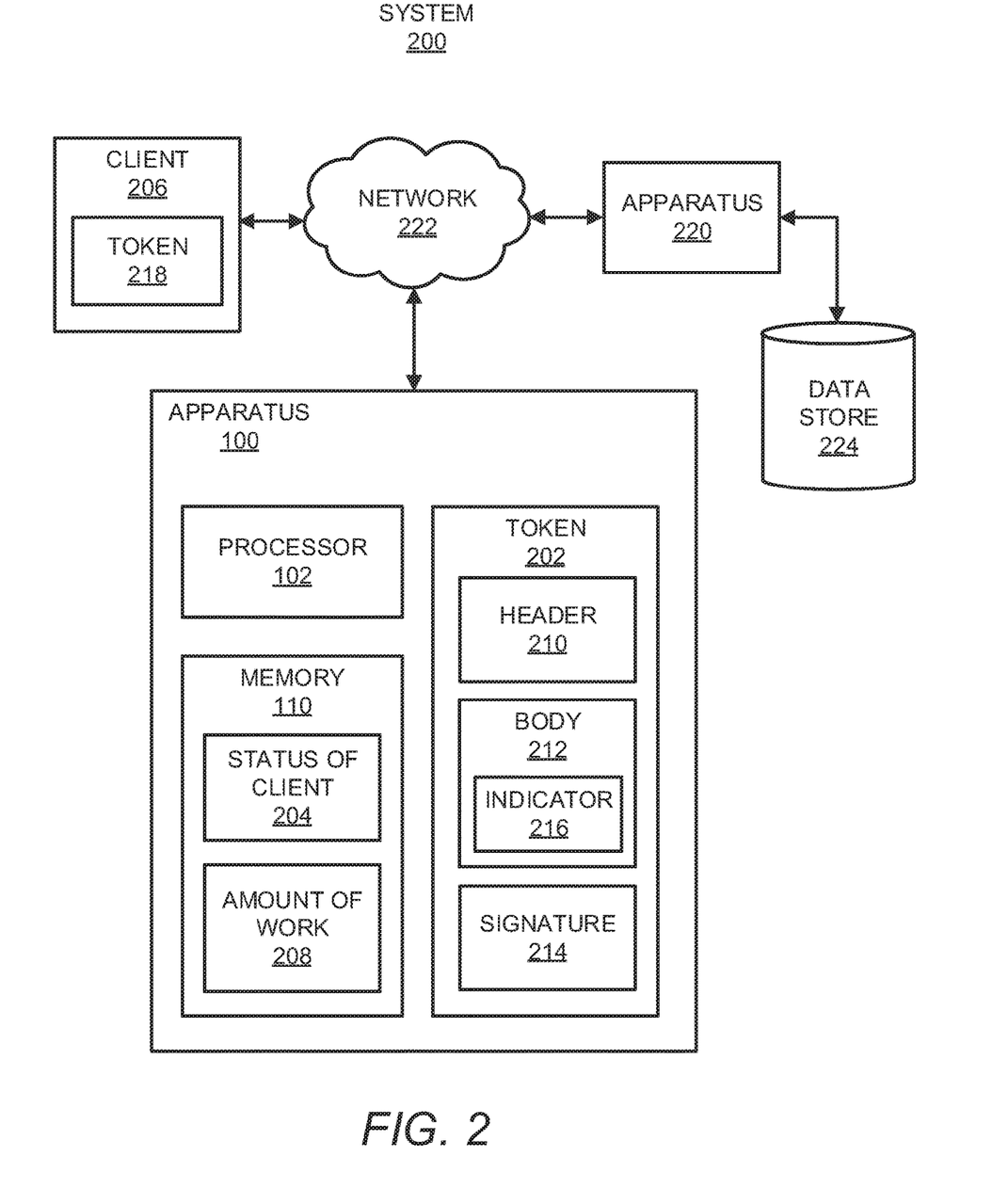
FIG. 2 shows a block diagram of an example system in which the example apparatus depicted in FIG. 1 may be implemented.

Reference is made to FIGS. 1 and 2. FIG. 1 shows a block diagram of an example apparatus 100 that may generate a token associated with API calls to be received from a client, in which the token includes a value representing a priority for determining adaptive rate limiting of the API calls from the client. FIG. 2 shows a block diagram of an example system 200 in which the example apparatus 100 depicted in FIG. 1 may be implemented. It should be understood that the example apparatus 100 depicted in FIG. 1 and the example system 200 depicted in FIG. 2 may include additional features and that some of the features described herein may be removed and/or modified without departing from the scopes of the apparatus 100 and/or the system 200.

The apparatus 100 may be a server (such as a management server), a node in a network (such as a data center), a personal computer, a laptop computer, a tablet computer, a smartphone, and/or the like. As shown, the apparatus 100 may include a processor 102 and a memory 110, e.g., a non-transitory computer-readable medium. In some examples, the apparatus 100 may be a management server in a cloud-based management platform that has stored thereon instructions that may cause the processor 102 to generate a token that represents a priority for subsequent requests from a client, in order to manage non-repudiation of the subsequent client requests at the management server.

The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single memory 110 may be understood to additionally or alternatively pertain to multiple processors 102 and/or multiple memories 110.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Erasable Programmable Read-Only Memory (EPROM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown, the memory 110 may have stored thereon instructions 112-116 that the processor 102 may fetch, decode, and execute. Particularly, the processor 102 may execute the instructions 112-116 to generate and send a token 202 associated with a status 204 of a client 206 and API calls to be received from the client 206. The instructions 112-116 may be non-transitory machine-readable instructions (or equivalently, non-transitory computer-readable instructions).

The processor 102 may fetch, decode, and execute the instructions 112 to receive a request from the client 206 for the status 204 of the client 206. In some examples, the client 206 may perform a periodic "check-in" with a management server, such as the apparatus 100, to reconcile a state of the client 206 and obtain details of the status 204 of the client 206. By way of non-limiting example, the status 204 of the client 206 may include at least one job to be performed at the client 206 including, for instance, to install patches at the client 206, to scan the client 206 for viruses, to scan software on the client 206, to install software on the client 206, and/or the like. The request from the client 206 may be received at predetermined times (e.g., at midnight), at predetermined intervals (e.g., every 12 hours), on-demand, and/or the like.

In response to the request from the client 206, the processor 102 may fetch, decode, and execute the instructions 114 to generate the token 202 associated with API calls to be received from the client 206. The token 202 may include a value representing a priority for determining adaptive rate limiting of the API calls to be received from the client 206. In this regard, the processor 102 may compute an amount of work 208 associated with the status 204 of the client 206. In some examples, the processor 102 may determine a number of API calls that the client 206 may make to a management server(s), a number of files to be downloaded, and/or the like, in order to complete the tasks associated with the status 204.

By way of particular example and for purposes of illustration, the processor 102 may access metadata to identify a number of patch files associated with a particular patch that is to be downloaded from the apparatus 100 for installation at the client 206. In some examples, the processor 102 may determine a number of API calls that the client 206 is to make, for instance, in order for the client 206 to download all of the identified patch files.

The processor 102, having computed the amount of work 208 to be completed on the client 206, may send a response to the client 206 that includes the status 204 of the client 206, which may include information related to work to be performed at the client. For instance, the apparatus 100 may send a list of jobs, a list of patches, a list of files, and/or the like to the client 206.

In some examples, the processor 102 may generate a token 202 associated with API calls to be received from the client 206 based on the status 204 of the client 206 and the amount of work 208 to be performed at the client 206. The token 202 may be included in all subsequent API calls from the client 206 and may be used for non-repudiation of the subsequent client requests at various management servers, such as apparatus 100. By way of particular example, the processor 102 may generate the token 202 as a light weight JSON token or a JWT token. In this regard, the token 202 may include a header 210, a body 212, and a signature 214.

The header 210 may include metadata about the token 202. In some examples, the header 210 may identify an algorithm that is used to generate the signature 214, identify a type of token (e.g., JWT), and/or the like. The signature 214 may securely validate the token, for instance, for non-repudiation of subsequent requests from the client 206.

The body 212 of the token 202 may include a value representing a priority for determining an adaptive rate limiting of the API calls to be received from the client 206. In some examples, the processor 102 may generate a name-value pair representing a priority associated with the API calls based on the amount of work 208 to be performed at the client and add the name-value pair into the body 212.

By way of particular example and for purposes of illustration, the body 212 may have the following structure:

```
{
    "iss" : " "serverguid" ",
    "priority indicator" :432,
    "work indicator" :123,
    "iat" : 1516239022,
    "exp" : 1516279022
}
```

The name-value pairs in the body may include, for instance, the "iss" field, which may represent an issuer of the token, the "priority indicator" field, which may represent a priority value of the token, the "work indicator" field, which may be an integer to indicate a number of API calls to be made by the client 206 to fulfill the job, the "iat" field, which may represent an issued time, the "exp" field, which may represent an expiry time, and/or the like.

In some examples, the processor 102 may generate an indicator 216 associated with the amount of work 208. By way of particular example, the indicator 216 may include a work indicator and a priority indicator. In this regard, the work indicator may correspond to a quantity for the amount of work 208 associated with the client 206. As shown in the example structure of the body 212 above, the work indicator may be the "work indicator" field and the corresponding value. The value of the work indicator may be an integer (e.g., "123"), which may correspond to a number of API calls required by the client 206 to complete a job, a number of files to be downloaded to the client 206, and/or the like. The processor 102 may determine the value of the work indicator to represent a relative priority of the request, for instance, in a case where the processor 102 determines that 123 API calls may be needed to install a particular patch, the processor 102 may set the value of the work indicator to be "123". In this regard, a server, such as the apparatus 100, that receives a subsequent request, in which the value of the work indicator is greater than zero, may grant the corresponding request based on the value of the work indicator.

In some examples, the indicator 216 may include the priority indicator. In this regard, the value of the token 202 representing the priority for determining adaptive rate limiting of the API calls to be received from the client 206 may include the priority indicator. For instance, as shown in the example structure of the body 212 above, the token 202 may include the priority indicator "pri" representing a priority value for the job. The priority indicator may be an integer that corresponds to a relative priority for the job, for instance, a higher value for a high priority task such as emergency security patches or a lower value for non-urgent maintenance items.

In some examples, the name-value pairs associated with the determined amount of work 208 and representing the priority of the API calls may include various types of data that may be used for determining whether to grant a particular request, for instance, to perform adaptive rate limiting. For instance, the name-value pairs may include, additionally or alternatively to the work indicator and/or the priority indicator as described above, categories of client devices, load balancing information, server load information, and/or the like.

The processor 102 may fetch, decode, and execute the instructions 116 to send a response to the request to the client 206. In some examples, the response may include a status 204 of the client 206, and may include information that identifies a job to be performed on the client 206, such as a list of patches to be installed, a list of files to be downloaded, and/or the like. The processor 102 may include the token 202 in the response. In this regard, the processor 102 may attach the token 202 as a new header in an HTTP response, for instance, as a JSON token or JWT token.

In some examples, the processor 102 may receive a second request from the client 206, which may include previously identified API calls to be received from the client 206. For instance, the second request may be an API call to access data associated with a job to be performed on the client 206. By way of particular example and for purposes of illustration, a downstream server, such as apparatuses 100 and/or 220, may be implemented to apply rate limiting at all times. In this instance, in response to receipt of the second request, the downstream server may choose to adaptively modify the rate limiting based on the token 202 included in the second request.

Alternatively or additionally, the downstream server may choose to initiate rate limiting once the amount of incoming traffic has reached a certain predetermined limit. In this instance, the downstream server may decide to implement adaptive rate limiting using the token 202 after the predetermined limit has been reached. In other examples, the downstream server may initiate adaptive rate limiting using the token 202 prior to initiating a static rate limiting algorithm. In some examples, the downstream server may be configurable by an administrator to implement when adaptive rate limiting using the token 202 may be implemented.

In this regard, the client 206 may attach a token 218 as part of each request to the apparatus 100, for instance, in every API call to the apparatus 100 to complete tasks associated with a job. The token 218 may be the same as the token 202 generated in the apparatus 100. In some examples, in the absence of the token 218 in a request, the apparatus 100 may make static rate limiting decisions, for instance, without regard to a priority of a job to be performed on the client 206. By way of particular example and for purposes of illustration, static rate limiting algorithms may include a token bucket algorithm, a leaky bucket algorithm, a fixed window counter algorithm, a sliding window log algorithm, a sliding window counter algorithm, and/or the like.

In some examples, the token 218 may be generated by another server on a network 222, such as apparatus 220. The apparatus 220 may be the same as the apparatus 100 and may include the same elements. In this instance, the job to be performed at the client 206 may be distributed among multiple servers, such as apparatuses 100, 220. In some examples, the apparatuses 100, 220 may include a data store 224 that may store information on the job, information on the amount of work 208 related to the job, information on tokens 202, 218 for different clients, and/or the like. In some examples, the apparatus 100 may access the data store 224 for information on the status 204 of the client 206 and the amount of work 208.

The processor 102 may authenticate the second request based on the signature 214 included in the token 218 prior to granting the second request. In some examples, the signature 214 may be used to verify that the token 218 is authentic, for instance, to confirm that the token 218 has not been altered or forged.

Based on successful authentication of the second request, the processor 102 may grant the second request based on a work indicator included in the token 218. The work indicator may be the same as indicator 216 as depicted in FIG. 2 and may be related to the amount of work 208 to be performed on the client 206. In some examples, the processor 102 may deny the second request in response to a determination that the work indicator is less than a predetermined value, for instance, a value of zero or less.

In some examples, the processor 102 may decrement the work indicator each time the processor 102 grants a request. For instance, in a case where the work indicator has a value of "123" corresponding to a number of API calls needed to complete the job, the processor 102 may decrement the value of the work indicator to "122" corresponding to the remaining number of API calls to complete the job. The processor 102 on apparatus 100, or another server such as apparatus 220, may decrement the value of the work indicator until the value reaches zero or another predetermined number, at which time the requests may no longer be given priority over other requests. In some examples, the processor 102 may also decrement or change values of other name-value pairs such as the priority indicator, the client load indicator, or the like based on updated conditions. The processor 102 may update the token 218 to include the decremented work indicator and return the updated token 218 to the client 206.

Figure 3:
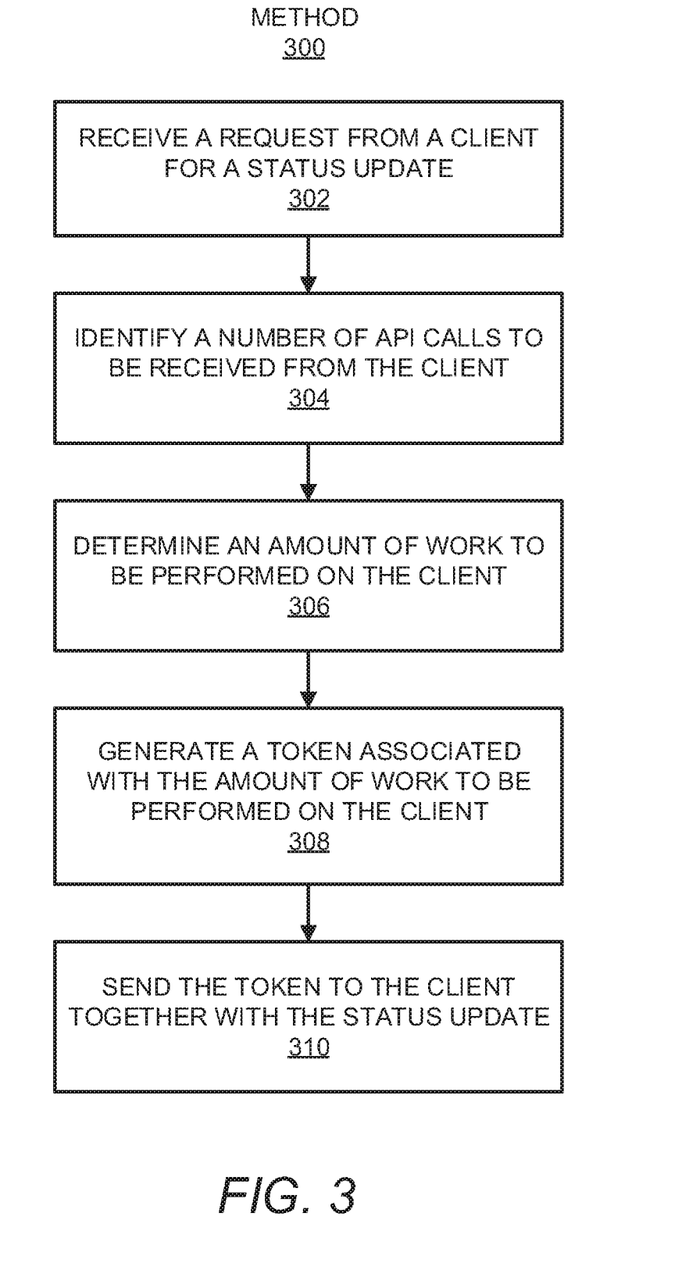
FIG. 3 shows a flow diagram of an example method for generating a token associated with an amount of work to be performed on the client, in which the token includes a work indicator representing a priority associated with a number API calls to be received from the client.

Various manners in which the processor 102 may operate are discussed in greater detail with respect to the method 300 depicted in FIG. 3. FIG. 3 depicts a flow diagram of an example method 300 for generating a token 202 associated with an amount of work 208 to be performed on the client 206, in which the token 202 includes a work indicator representing a priority associated with a number of API calls to be received from the client 206. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may receive a request from a client 206 for a status update. The request for the status update may be a periodic request, a scheduled request, an on-demand request, or the like, and may allow a client 206 to reconcile its state and obtain a list of work-to-be-done at the client 206. At block 304, the processor 102 may identify a number of API calls to be received from the client 206 in response to the request for the status update. The identified number of API calls may be associated with the amount of work 208 and job(s) to be performed at the client 206. For instance, the processor 102 may identify the job based on the status 204 of the client 206, in which the identified job may be a list of patches to be installed at the client 206, a list of tasks to be performed at the client 206 such as virus scanning, and/or the like.

At block 306, the processor 102 may determine an amount of work 208 to be performed on the client 206. The amount of work 208 may be associated with the number of API calls to be received from the client 206. The processor 102 may compute the amount of work 208 based on, for instance, the number of API calls to be made by the client 206 to complete the job, a number of files to be downloaded by the client 206, and/or the like. In some examples, the number of API calls to be received from the client 206 may correspond to the number of files to be downloaded by the client 206.

At block 308, the processor 102 may generate a token 202 associated with the amount of work 208 to be performed on the client 206. The token 202 may include the indicator 216 as depicted in FIG. 2, that represents a priority associated with the amount of work 208 to be performed on the client 206. The indicator 216 may be a work indicator representing a priority based on the number of API calls to be received from the client 206 and/or a priority indicator representing a priority value associated with the client 206, the status 204, the job, and/or the like. In some examples, the processor 102 may generate the token 202 to include a header 210, a body 212, and a signature 214. In this regard, the body 212 may include the indicator 216 representing the priority associated with the number of API calls to be received from the client 206.

In some examples, the token 202 may have a predefined structure, for instance, a JSON structure. In one instance, the token 202 may be in a JWT structure having a plurality of fields (or claims) that may be used in a JWT claim set. The processor 102 may determine a plurality of name-value pairs corresponding to the amount of work 208 to be performed on the client 206. For instance, the plurality of name-value pairs may include the work indicator (e.g., the "work indicator" field), an identification of an issuer (e.g., the "iss" field) of the work indicator, a priority indicator (e.g., the "priority indicator" field) associated with the work indicator, a work indicator issued time (e.g., the "iat" field), a work indicator expiration time (e.g., the "exp" field), a category of devices associated with the client, server load balancing information, and/or the like.

The processor 102 may determine a number of API calls and/or a number of files to be downloaded associated with a job to be performed on the client 206. The processor 102 may generate the indicator 216 based on the number of API calls and/or the number of files to be downloaded associated with the job to be performed on the client 206. In some examples, the processor 102 may generate the indicator 216 as an integer based on the number of API calls and/or the number of files to be downloaded.

At block 310, the processor 102 may send the token 202 together with the status 204 of the client 206 and/or an identification of the job to be performed on the client 206 to the client 206. The client 206, upon receiving the token 202, may send the token 202 together with each subsequent request to various servers on the network 222 to complete the job.

In some examples, the processor 102 may receive a second request from the client 206, for instance, to perform a task or a job associated with the status 204 of the client 206. The second request may include API calls in accordance with the status 204 of the client 206 received from the apparatus 100. In this regard, the API calls may be requests to download files associated with the job to be performed on the client 206, such as to download files related to patches to be installed at the client 206, or the like. The client 206 may include a token 218 with every request/API call to apparatuses 100, 220. In this regard, the token 218 may be the same as token 202 generated at apparatus 100, or the token 218 may be a different token generated at a different apparatus 220.

The processor 102 may determine that the token 218 is included in the second request and may authenticate the second request based on a signature 214 included in the token 218. The processor 102 may grant access to the API call based on a value of the indicator 216. In response to granting the access to the API call, the processor 102 may decrement the value of the indicator 216 and return an updated token 218 having the value of the indicator 216 that is decremented.

By way of particular example, the indicator 216 may be a work indicator that may be related to the amount of work 208 to be performed on the client 206. The work indicator may correspond to a number of API calls to complete a task associated with the amount of work 208, a number of files to be downloaded to complete the task, and/or the like. By way of particular example and for purposes of illustration, the work indicator may be an integer having an initial value of "123" which may correspond to a total of 123 API calls to install a patch on the client 206. In this regard, after each instance in which an API call is made to a downstream server, such as apparatus 100 or apparatus 220 as depicted in FIG. 2, the processor 102 may decrement the work indicator to reflect the processed API call and may return to the client 206 an updated token 218 having the decremented work indicator.

In some examples, a particular job associated with the status 204 of the client 206 may be split into two groups, each having a different token 202 associated with different priorities. For instance, for a given job to be performed on the client 206, the processor 102 may generate a first token associated with a high priority and a second token associated with a low priority which may be processed differently than the first token. By way of particular example and for purposes of illustration, a patch may have a first portion to be installed at a higher priority and a second portion that may be installed at a lower priority. In this instance, the first portion of the patch may be associated with a first token that includes a priority indicator having a relatively higher value and the second portion of the patch may be associated with a second token that includes a priority indicator having a relatively lower value.

In some examples, a processor 102 may modify a priority of a previously issued token 202. For instance, the processor 102 may update the indicator 216 of the token 202, such as the work indicator, the priority indicator, and/or the like, based on changes in the status 204 of the client 206. In some examples, in response to receipt of an API call from the client 206 to perform scheduled work on the client 206, a processor of a downstream server, such as apparatus 100 or 220, may update the token 202 included in the received API call to reflect an updated status 204 of the client 206. By way of particular example, the processor 102 may modify or void a previously issued token 202 that is associated with installation of a particular patch in response to a changed status 204 of the client 206 indicating, for instance, that the patch is no longer to be installed or that a different job is to take precedence over the patch.

In some examples, prioritized API calls may be adaptively rate limited based on a predetermined threshold. By way of particular example and for purposes of illustration, a downstream server may initially allow access to prioritized API calls based on a presence of a token 202 indicating priority for work to be performed at the client 206. In this regard, the downstream server may being to disallow the prioritized API calls when a predetermined condition is met, such as a predetermined threshold for incoming data, load balancing needs, or the like. In some examples, the downstream server may require an increased priority for incoming API calls in response to exceeding the predetermined threshold.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic apparatus capable of executing the above-described functions may perform those functions enumerated above.

Figure 4:
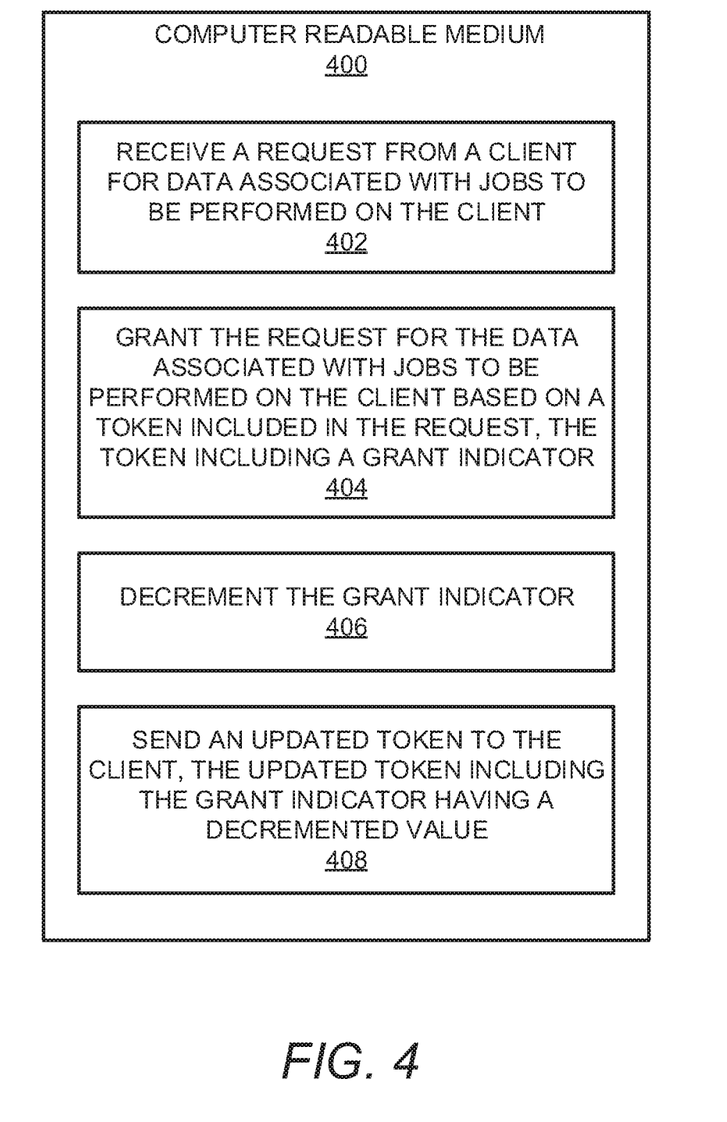
FIG. 4 shows a block diagram of an example non-transitory computer-readable medium that may have stored thereon machine readable instructions to grant access to data for at least one job to be performed on the client based on a token included in a request, and decrementing a work indicator included in the token in response to granting the request.

Turning now to FIG. 4, there is shown a block diagram of an example non-transitory computer-readable medium 400 that may have stored thereon machine readable instructions to grant access to data for at least one job to be performed on the client 206 based on a token 218 included in a request, and decrementing the work indicator 216 included in the token 218 in response to granting the request. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium. The term "non-transitory" does not encompass transitory propagating signals. The description of the non-transitory computer-readable medium 400 is also made with reference to the features depicted in FIGS. 1-3 for purposes of illustration. Particularly, the processor 102 of the apparatus 100 may execute some or all of the instructions 402-408 included in the non-transitory computer-readable medium 400.

The computer-readable medium 400 may have stored thereon machine-readable instructions 402-408 that a processor, such as the processor 102 depicted in FIGS. 1 and 2, may execute. The computer-readable medium 400 may be an electronic; magnetic, optical, or other physical storage device that contains or stores executable instructions. The computer-readable medium 400 may be, for example, RAM, EEPROM, a storage device, an optical disc, or the like.

The processor may fetch, decode, and execute the instructions 402 to receive a request from a client 206 for data associated with at least one job to be performed on the client 206. The processor may fetch, decode, and execute the instructions 404 to grant the request for the data associated with the at least one job to be performed on the client 206 based on a token 218 included in the request. In this regard, the token 218 may include a work indicator, such as indicator 216 as depicted in FIG. 2, which may be based on an amount of work 208 associated with the at least one job to be performed on the client 206.

The processor may fetch, decode, and execute the instructions 406 to decrement the work indicator in response to granting the request for the data associated with the at least one job to be performed on the client 206. The processor may fetch, decode, and execute the instructions 408 to send an updated token 218 to the client 206. The updated token 218 may include the work indicator that has a decremented value. In this regard any server (e.g., apparatuses 100, 220) that subsequently receives a request including the token 218 may grant the request based on the work indicator included in the token 218, and decrement the value of the work indicator based on the remaining amount of work 208.

In some examples, the processor may determine a remaining number of API calls and/or a remaining number of files to be downloaded associated with the at least one job to be performed on the client 206 after the request for the data associated with at least one job to be performed on the client 206 is granted. The processor may decrement the work indicator based on the remaining number of API calls and/or the remaining number of files to be downloaded associated with the at least one job to be performed on the client.

In some examples, the processor may generate the token 218 to be a JSON token or a JWT token. In this regard, the token 218 may include a header 210, a body 212, and a signature 214 and the work indicator may be included in the body 212.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
    a processor; and
    a memory on which are stored machine-readable instructions that when executed by the processor, cause the processor to:
    receive a request from a client for a status of the client, the status of the client being correlated to an amount of work to complete a job at the client;
    determine a number of application programming interface (API) calls needed to complete the job at the client based on the status of the client correlated to the amount of work to complete the job at the client;
    generate a token associated with the determined number of API calls needed to complete the job, the token including an indicator correlated to the determined number of API calls needed to complete the job at the client; and
    send a response to the request, the response including the status of the client and the token.

2. The apparatus of claim 1, wherein the instructions cause the processor to:
    generate the token to include a header, a body, and a signature, wherein the body includes the indicator to represent a priority for determining an adaptive rate limiting of the determined number of API calls needed to complete the job.

3. The apparatus of claim 2, wherein the instructions cause the processor to:
    determine the amount of work to complete the job in response to the received request from the client; and
    generate a name-value pair associated with the amount of work, the name-value pair to be included in the body of the token.

4. The apparatus of claim 3, wherein the generated name-value pair includes:
    the determined number of API calls that the client is to make to complete the job; and/or a number of files that the client is to download to complete the job.

5. The apparatus of claim 4, wherein the name-value pair associated with the amount of work includes an integer based on the determined number of API calls to be made to complete the job and/or the number of files to be downloaded to complete the job.

6. The apparatus of claim 2, wherein the instructions cause the processor to:
    generate the token to include the indicator representing the priority associated with the adaptive rate limiting of the determined number of the API calls needed to complete the job, the indicator including at least one of:
    a work indicator indicating the amount of work to be performed on the client;
    a priority indicator associated with the client;
    a category of device associated with the client; or
    server load information.

7. The apparatus of claim 1, wherein the token is a JavaScript Object Notation (JSON) token or a JSON Web Token (JWT).

8. The apparatus of claim 1, wherein the instructions cause the processor to:
    receive a second request from the client to access data associated with the job to be completed at the client, the second request including the token;
    authenticate the second request based on a signature included in the token; and
    grant the second request based on the indicator included in the token, the indicator including a work indicator comprising the determined number of API calls needed to complete the job at the client and a priority indicator correlated to a priority value for the job.

9. The apparatus of claim 8, wherein the instructions cause the processor to:
    in response to a determination that the work indicator is less than a predetermined value, deny the second request.

10. The apparatus of claim 8, wherein the instructions cause the processor to:
    in response to granting the second request, decrement the work indicator; update the token to include the work indicator that is decremented; and return the updated token to the client.

11. A method comprising:
    receiving, by a processor, a request from a client for a status update, the status update including information regarding an amount of work to complete a job at the client;
    in response to the request for the status update, identifying, by the processor, a number of application programming interface (API) calls needed to complete the job at the client based on the status of the client correlated to the amount of work to complete the job at the client;
    generating, by the processor, a token associated with the amount of work to complete the job at the client, the token including a work indicator correlated to the identified number of API calls needed to complete the job at the client; and
    sending, by the processor, the token including the work indicator to the client together with the status update.

12. The method of claim 11, further comprising:
    generating the token to include a header, a body, and a signature, wherein the body includes the work indicator based on the amount of work to complete the job at the client.

13. The method of claim 12, wherein the token is a JavaScript Object Notation (JSON) token or a JSON Web Token (JWT).

14. The method of claim 12, further comprising:
    determining a plurality of name-value pairs corresponding to the amount of work to complete the job at the client, the plurality of name-value pairs including at least one of: the work indicator, an identification of an issuer of the work indicator, a priority indicator associated with the work indicator, a work indicator issued time, a work indicator expiration time, a category of devices associated with the client, and/or server load balancing information.

15. The method of claim 11, further comprising:
identifying the number of API calls needed and/or a number of files to be downloaded to complete the job at the client; and
generating the work indicator based on the identified number of API calls needed and/or the number of files to be downloaded to complete the job at the client.

16. The method of claim 15, wherein the work indicator is an integer based on the identified number of API calls needed and/or the number of files to be downloaded to complete the job at the client.

17. The method of claim 11, further comprising:
receiving a second request from the client, the second request including an API call among the identified number of API calls needed to complete the job;
determining that the token is included in the second request;
authenticating the second request based on a signature included in the token; granting access to the API call based on a value of the work indicator;
in response to granting the access to the API call, decrementing the value of the work indicator; and
returning an updated token having the decremented value of the work indicator.

18. A non-transitory computer-readable medium on which is stored machine-readable instructions that, when executed by a processor, cause the processor to:
receive a request from a client for data associated with at least one job to be performed on the client;
grant the request for the data associated with the at least one job to be performed on the client based on a token included in the request, the token including a work indicator based on an amount of work associated with the at least one job to be performed on the client, the work indicator including a number of application programming interface (API) calls needed to complete the at least one job on the client and/or a number of files to be downloaded to complete the at least one job on the client;
decrement the work indicator in response to granting the request for the data associated with the at least one job to be performed on the client; and
send an updated token to the client, the updated token including the work indicator having a decremented value.

19. The non-transitory computer-readable medium of claim 18, wherein the token is a JavaScript Object Notation (JSON) token or a JSON Web Token (JWT), the token including a header, a body, and a signature and the work indicator is included in the body.

20. The non-transitory computer-readable medium of claim 18, further comprising:
determine a remaining number of application programming interface (API) calls needed to complete the at least one job on the client and/or a remaining number of files to be downloaded to complete the at least one job on the client after the request for the data associated with the at least one job to be performed on the client is granted; and
decrement the work indicator based on the remaining number of API calls and/or the remaining number of files to be downloaded to complete the at least one job on the client.

* * * * *